Patented Aug. 5, 1947

2,425,144

UNITED STATES PATENT OFFICE 2,425,144

NITRO-ALCOHOL ESTERS OF MONO-ALLYL MALEATE

Herman A. Bruson and George B. Butler, Philadelphia, Pa., assignors to Röhm & Haas Company, Philadelphia, Pa., a corporation of Delaware No Drawing. Application September 9, 1944, Serial No. 553,462

4 Claims. (Cl. 260—485)

This invention relates to mixed esters of nitro-alcohols and unsaturated aliphatic alcohols with α,β-unsaturated dicarboxylic acids, which are readily combustible plasticizers, and to plastic compositions prepared therefrom with nitrocellulose. This invention, which is a continuation-in-part of United States Serial No. 519,197, filed January 21, 1944, deals with esters having the formula:

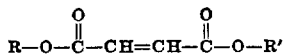

wherein R is a nitro- or polynitro-hydrocarbon radical from a monohydric nitroalcohol containing at least one nitro group for each four carbon atoms present therein and R' is the hydrocarbon residue of a β,γ-unsaturated aliphatic alcohol. These esters are readily combustible, polymerizable plasticizers for nitrocellulose.

The above nitro esters polymerize upon exposure to heat, light, air, and/or catalysts, such as benzoyl peroxide, to form transparent plastics varying from hard, glassy masses to tough, somewhat elastic rubbery materials. They may be mixed in the monomeric or unpolymerized condition or in the partially polymerized condition with nitrocellulose to give homogeneous gels therewith. Both the polymers and the plastic compositions formed with nitrocellulose burn in the air with great vigor and possess explosive properties. They are particularly useful for the preparation of charges for rockets, fuses, flares, and the like. The esters of this invention also serve as combustible binders or plasticizers for guncotton, TNT, picric acid, and other explosive compositions.

As a monohydric nitroalcohol for the preparation of these new esters, there may be used 2-nitroethanol-1, 2-nitropropanol-1, 2-nitrobutanol-1, 2-nitro-2-methylpropanol - 1, 1 - dinitrophenyl-2-nitro-2-methylpropanol - 1, 1 - trinitrophenyl - 2 - nitro-2-methylpropanol - 1, 2,4,6-trinitrophenylethanol, and other monohydric aliphatic or arylaliphatic alcohols in which there is present at least one nitro group for each four or fewer carbon atoms.

As a β,γ-unsaturated aliphatic alcohol, there may be used allyl, methallyl, or crotyl alcohol, or methylvinyl carbinol, propargyl alcohol, and the like.

The dibasic carboxylic nucleus may be obtained from maleic or fumaric acids or their acyl halides or maleic anhydride.

The new esters of this invention are readily obtainable in several ways. For example, maleic anhydride can be first esterified with a nitroalcohol corresponding to group R and the resulting half ester subsequently esterified with the unsaturated alcohol, R'OH, or vice versa.

Another procedure is to condense the acid chloride of the half ester of one alcohol with the other alcohol.

Although the esters may be prepared in the absence of solvents other than the reactants themselves, it is preferred that a solvent be used. Suitable for this purpose are chlorinated solvents, such as carbon tetrachloride or ethylene dichloride; hydrocarbons, such as naphtha, benzene, toluene, or xylene; or ethers, such as isopropyl ether, butyl ether, or the like, or mixtures of such solvents.

The esterifications involved may be performed within the range of 50° C. to 150° C., although both somewhat lower and higher temperatures may be used, depending upon reactants, solvents, etc.

There may be used in the reaction mixture polymerization inhibitors, such as hydroquinone-pyrogallol, β-naphthol, etc.

When the monomers of this invention are used as combustible plasticizers, they may be mixed with nitrocellulose of the explosive type with or without the aid of volatile solvents or other organic solvents, such as ether, alcohol, acetone, etc. While the widest proportions of the two may be used, the preferred proportions lie between 25 and 50 parts of the new mixed esters of this invention to 100 parts of nitrocellulose, particularly the type of nitrocellulose known as guncotton. The colloided product may be extruded or otherwise shaped as desired. The nature of the final colloided product depends upon both the proportions used, the particular mixed ester selected, and the presence or absence of organic solvents. If desired, the mixed esters of this invention may be polymerized in the nitrocellulose mixtures.

The following examples illustrate this invention:

Example 1

A mixture of 78 grams (0.5 mol) of maleic acid mono-allyl ester, 60 grams (0.5 mol) of 2-nitro-1-butanol, 150 cc. of dry benzene, and 0.5 cc. of concentrated sulfuric acid was boiled under a reflux condenser attached to a water separator for five hours, until no more water collected in the trap. After the mixture had been cooled, five grams of powdered anhydrous sodium carbonate was added and the mixture stirred for one hour at room temperature. The mixture was filtered and the clear filtrate evaporated to dryness in vacuo. The residual oil was then distilled in vacuo. The allyl 2-nitrobutyl maleate

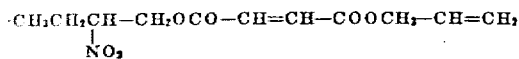

distilled over at 156°–163° C./2–3 mm. as a pale yellow oil. It serves as a colloiding agent for guncotton and can also be polymerized to a transparent plastic on heating with 1–2% of benzoyl peroxide at 95°–100° C. When 100 parts of guncotton is carefully stirred with 25 to 50 parts of allyl 2-nitrobutyl maleate, there is obtained an especially useful explosive.

Example 2

A mixture consisting of 72 grams of maleic acid monoallyl ester, 56 grams of 2-nitro-2-methyl propanol, 150 cc. of benzene, and 0.5 cc. of concentrated sulfuric acid was refluxed for five hours with water removal and worked up as described in Example 1. The allyl 2-nitro-2-methyl propyl maleate

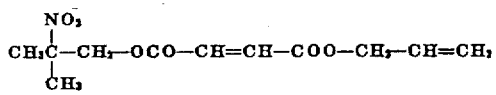

was obtained as a colorless oil which boiled at 162°–163° C./2 mm. It polymerizes to a transparent, plastic, readily combustible mass when heated with 1–2% by weight of benzoyl peroxide at 100° C. It may also be copolymerized with an equal weight of di-(2-nitro-2-methyl propyl)-maleate in the presence of 2% by weight of benzoyl peroxide to a combustible polymer. It may be used for the colloiding of nitrocellulose.

Example 3

A mixture consisting of 78 grams of maleic acid mono-allyl ester, 53 grams of 1-nitro-propanol-2, 150 cc. of benzene, and one gram of concentrated sulfuric acid was boiled under reflux for eight hours while the water formed was continually removed by a water separator. After the mixture was cooled, the product was washed thoroughly with water and the solvent distilled off. The residual oil was distilled in vacuo to yield allyl 1-nitro-isopropyl maleate

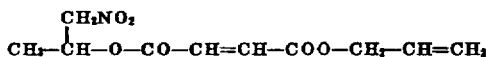

as a pale yellow oil which boiled at 160° C./2 mm. When heated at 100° C. with 1–2% by weight of benzoyl peroxide, it polymerized to a darkbrown, thermoplastic, readily combustible resin. It may be used for the colloiding of nitrocellulose.

Example 4

By using 0.5 mol of maleic acid mono-methallyl ester in place of the maleic acid mono-allyl ester in Example 2, the corresponding methallyl 2-nitro-2-methyl propyl maleate

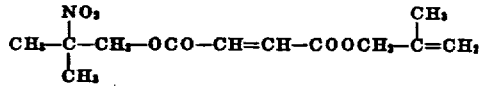

is obtained as a colorless oil which boils at 158°–159° C./1–2 mm. When heated with 2% by weight of benzoyl peroxide at 95°–100° C., it polymerized to a clear, yellowish, combustible plastic. It may be used for the colloiding of nitrocellulose.

Example 5

A mixture of 0.5 mol each of 2-nitro-2-methyl propanol and maleic acid monopropargyl ester in 150 cc. of benzene was boiled in the presence of 0.5 cc. of concentrated sulfuric acid for five to six hours under a reflux condenser attached to a water trap. After it was washed and dried, the product was distilled in vacuo to yield 2-nitro-2-methyl propyl propargyl maleate

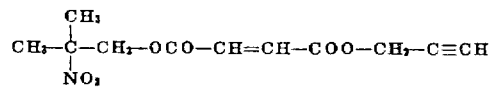

as a colorless oil which boiled at 145°–155° C./2–3 mm.

A sample of the oil was mixed with 2% by weight of benzoyl peroxide and polymerized at 100° C. to a thick syrup. This syrup was coated onto a sheet of steel and heated at 100° C. until a clear, hard, polymer film was formed.

Example 6

To a solution of 2,4,6-trinitrophenylethanol in 70 cc. of hot dry benzene, there was gradually added 7.5 grams of the acid chloride of fumaric acid mono-allyl ester,

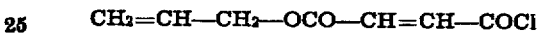

dissolved in 20 cc. of dry benzene. The mixture was boiled for several hours, cooled, and the product washed with water, dilute sodium carbonate solution, and finally with water, then evaporated to dryness in vacuo. The residual oil was purified by several washings with hot alcohol and finally dried in vacuo at 90° C. The trinitrophenylethyl allyl fumarate

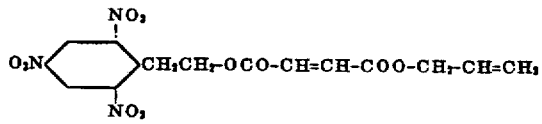

which was obtained polymerized when heated with benzoyl peroxide (1%) at 100° C. to a soft, pliable, non-tacky resin.

The corresponding maleate is obtained by heating one molecular equivalent each of maleic anhydride and 2,4,6-trinitrophenylethanol at 80° C. in benzene solution for several hours, then adding an excess of allyl alcohol, a small amount (1 cc.) of concentrated sulfuric acid, and refluxing until no more water is evolved, then cooling, washing, and evaporating off the solvent and excess allyl alcohol. It is a brown oil which also polymerizes as above to an explosive plastic. It may be used for the colloiding of nitrocellulose.

We claim:

1. A monomeric ester having the formula:

in which R is a nitro hydrocarbon radical containing at least one nitro group for each four carbon atoms thereof and is selected from the class consisting of nitroalkyl radicals containing not over four carbon atoms and nitro phenylalkyl radicals containing not over ten carbon atoms.

2. A monomeric ester having the formula:

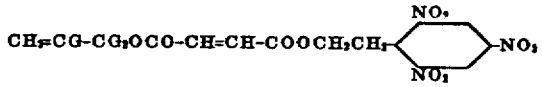

3. A monomeric ester having the formula:

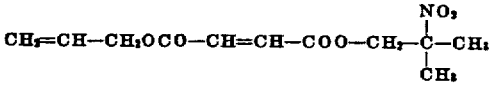

4. A monomeric ester having the formula:

HERMAN A. BRUSON.
GEORGE B. BUTLER.

REFERENCES CITED

The following references are of record in the file of this patent:

UNITED STATES PATENTS

| Number | Name | Date |
|---|---|---|
| 2,153,987 | Nicodemus | Apr. 11, 1939 |
| 2,076,772 | Goodyear | Apr. 13, 1937 |
| 2,365,717 | Mighton | Dec. 26, 1944 |
| 2,295,513 | Bradley | Sept. 8, 1942 |
| 2,275,467 | Pollack et al. | Mar. 10, 1942 |
| 2,254,382 | Neher | Sept. 2, 1941 |
| 2,351,133 | Knight | June 13, 1944 |

Certificate of Correction

Patent No. 2,425,144. August 5, 1947.

HERMAN A. BRUSON ET AL.

It is hereby certified that error appears in the printed specification of the above numbered patent requiring correction as follows: Column 4, line 67, claim 2, for that portion of the formula reading "CG—CG$_2$" read $CH-CH_2$; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*

4. A monomeric ester having the formula:

HERMAN A. BRUSON.
GEORGE B. BUTLER.

REFERENCES CITED

The following references are of record in the file of this patent:

UNITED STATES PATENTS

| Number | Name | Date |
|---|---|---|
| 2,153,987 | Nicodemus | Apr. 11, 1939 |
| 2,076,772 | Goodyear | Apr. 13, 1937 |
| 2,365,717 | Mighton | Dec. 26, 1944 |
| 2,295,513 | Bradley | Sept. 8, 1942 |
| 2,275,467 | Pollack et al. | Mar. 10, 1942 |
| 2,254,382 | Neher | Sept. 2, 1941 |
| 2,351,133 | Knight | June 13, 1944 |

Certificate of Correction

Patent No. 2,425,144.                                                                 August 5, 1947.

HERMAN A. BRUSON ET AL.

It is hereby certified that error appears in the printed specification of the above numbered patent requiring correction as follows: Column 4, line 67, claim 2, for that portion of the formula reading "CG—CG$_2$" read $CH—CH_2$; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*